US006760783B1

(12) United States Patent
Berry

(10) Patent No.: US 6,760,783 B1
(45) Date of Patent: Jul. 6, 2004

(54) VIRTUAL INTERRUPT MECHANISM

(75) Inventor: Frank L. Berry, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,189

(22) Filed: Dec. 17, 1999

Related U.S. Application Data

(60) Provisional application No. 60/135,259, filed on May 21, 1999.

(51) Int. Cl.[7] ............................................. G06F 9/54
(52) U.S. Cl. ........................................ 709/318; 710/260
(58) Field of Search ............................. 710/260–269; 709/318, 320–327; 714/38; 713/1, 2, 100

(56) References Cited

U.S. PATENT DOCUMENTS

| | | | |
|---|---|---|---|
| 5,208,810 A | 5/1993 | Park | |
| 5,475,433 A | 12/1995 | Jeong | |
| 5,539,201 A | * 7/1996 | Liva et al. | ............. 250/227.21 |
| 5,550,957 A | 8/1996 | Davidson, Jr. et al. | |
| 5,633,870 A | 5/1997 | Gaytan et al. | |
| 5,777,624 A | 7/1998 | Munson | |
| 5,797,038 A | * 8/1998 | Crawford et al. | ............. 710/48 |
| 5,937,436 A | 8/1999 | Watkins | |
| 5,991,797 A | * 11/1999 | Futral et al. | ................ 709/216 |
| 6,078,970 A | * 6/2000 | Nordstrom et al. | ........... 710/19 |
| 6,112,263 A | 8/2000 | Futral | |
| 6,125,433 A | 9/2000 | Horstmann et al. | |
| 6,473,827 B2 | * 10/2002 | McMillen et al. | .......... 710/316 |
| 6,591,309 B1 | * 7/2003 | Shah | ............................. 710/2 |

* cited by examiner

*Primary Examiner*—St. John Courtenay, III
(74) *Attorney, Agent, or Firm*—Blakely Sokoloff Taylor & Zafman

(57) ABSTRACT

A host coupled to a switched fabric including one or more fabric-attached I/O controllers. Such a host may comprise a processor; at least one host-fabric adapter coupled to said processor and provided to interface with a switched fabric, which generates an event; and an operating system comprising multiple channel drivers and a host-fabric adapter software stack providing a virtual interrupt mechanism to each channel driver to handle the flow of event information from the host-fabric adapter to a designated channel driver for event processing.

26 Claims, 7 Drawing Sheets

EXAMPLE SOFTWARE DRIVER STACKS FOR HOST HAVING
FABRIC-ATTACHED I/O

VIRTUAL INTERRUPT MECHANISM

CLAIM FOR PRIORITY

This application makes reference to, incorporates the same herein, and claims all benefits accruing under 35 U.S.C. §120 from an application for NGIO Software Channel Inventions filed on May 21, 1999 and there duly assigned Ser. No. 60/135,259.

TECHNICAL FIELD

The present invention relates to a data network, and more particularly, relates to a Virtual Interrupt Mechanism for handling the flow of event information in a host.

BACKGROUND

Computer systems are designed to support one or more input/output (I/O) devices, including, for example, keyboards, input mouses, disk controllers, serial and parallel ports to printers, scanners, and display devices. These I/O devices and hardware resources may be available locally within a host or remotely via a data network (cluster) of interconnected nodes and switches that are linked together by a switched fabric. These I/O devices require intermittent servicing by a host processor in order to ensure proper operation. The host processor may be required to service these I/O devices with a specific resource in accordance with their individual needs while running one or more background programs. Usually, device event (interrupt) requests from hardware (e.g., local I/O devices or network adapters for communication with remote I/O devices via the switched fabric) 20 in a host 10, as shown in FIG. 1, are routed to an interrupt controller (IC) 30 that can interrupt the host processor, forcing a branch (driver) 42 of an operating system (OS) 40 via a Kernel 44 to a special Interrupt Service Routine (IRS) 46 for execution when required. The IRS 46 typically performs actions required by the operating system (OS) 40 and the hardware 20, disables interrupt signal generation from the hardware 20, and determines the meaning of the interrupt.

However, when multiple software drivers 42A–42N reside in a host 10 that share a single hardware 20 and are not aware of each other in an operating system environment as shown in FIG. 2, there may be problems in sharing a single hardware 20. In addition, there is no mechanism for handling a large number of interrupts (event requests) and directing a particular interrupt (event request) and associated information to a specific driver in a host system having multiple software drivers. Accordingly, there is an urgent need for a mechanism to handle a large number of interrupts (event requests) and effectively direct a particular interrupt (event request) and associated information to a specific driver in a host, especially when such a host is connected to a data network of different endpoints (nodes) and switches that are linked together by a switched fabric.

SUMMARY

Accordingly, various embodiments of the present invention are directed to a host coupled to a switched fabric including one or more fabric-attached I/O controllers. Such a host may comprise a processor; at least one host-fabric adapter coupled to the processor and provided to interface with the switched fabric, which generates an event; and an operating system comprising multiple channel drivers and a host-fabric adapter software stack providing a virtual interrupt mechanism to each channel driver to handle the flow of event information between the host-fabric adapter and a designated channel driver for event processing.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks and clusters designed to link together computers, servers, peripherals, storage devices, and communication devices for communications. Examples of such data networks may include a local area network (LAN), a wide area network (WAN), a campus area network (CAN), a metropolitan area network (MAN), a global area network (GAN), a storage area network and a system area network (SAN), including newly developed data networks using Next Generation I/O (NGIO) and Future I/O (FIO) and Server Net and those networks which may become available as computer technology develops in the future. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on exemplary use of a simple data network having several example host systems and I/O units including I/O controllers that are linked together by an interconnection fabric, although the scope of the present invention is not limited thereto.

Figure 2:
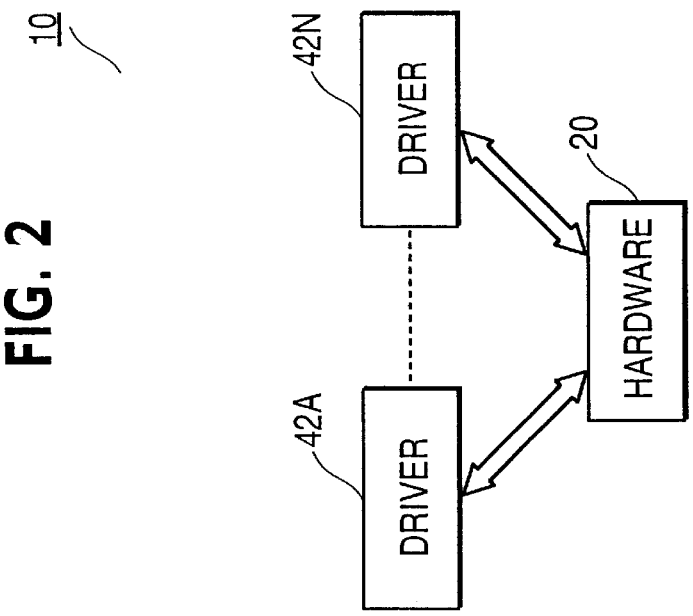
FIG. 2 illustrates multiple software drivers of a host that share a single hardware shown in FIG. 1.
Figure 1:
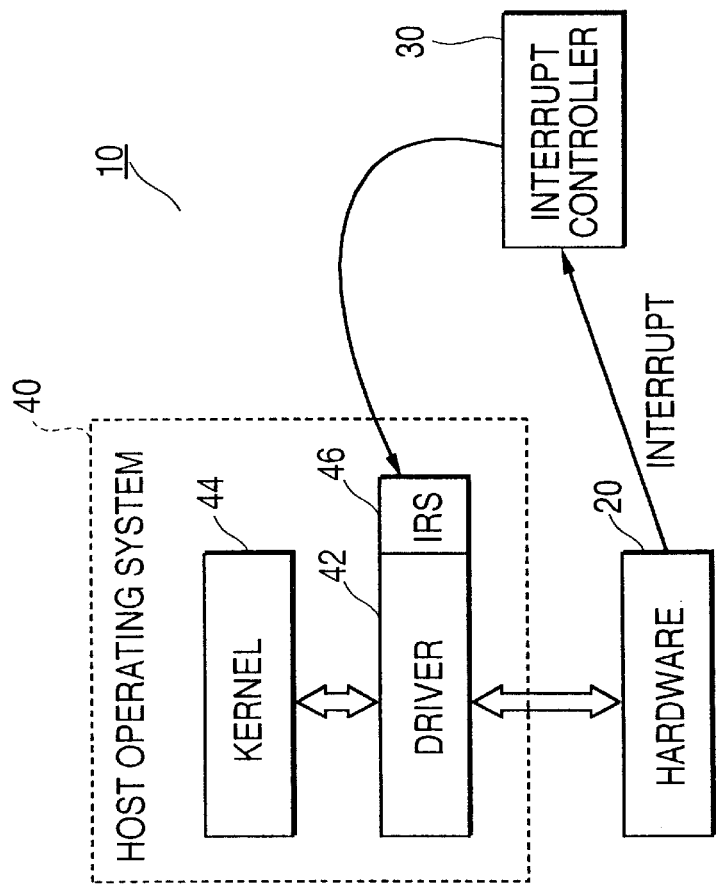
FIG. 1 illustrates a typical software driver stack of a host for handling an interrupt (event request) from a hardware.
Figure 3:
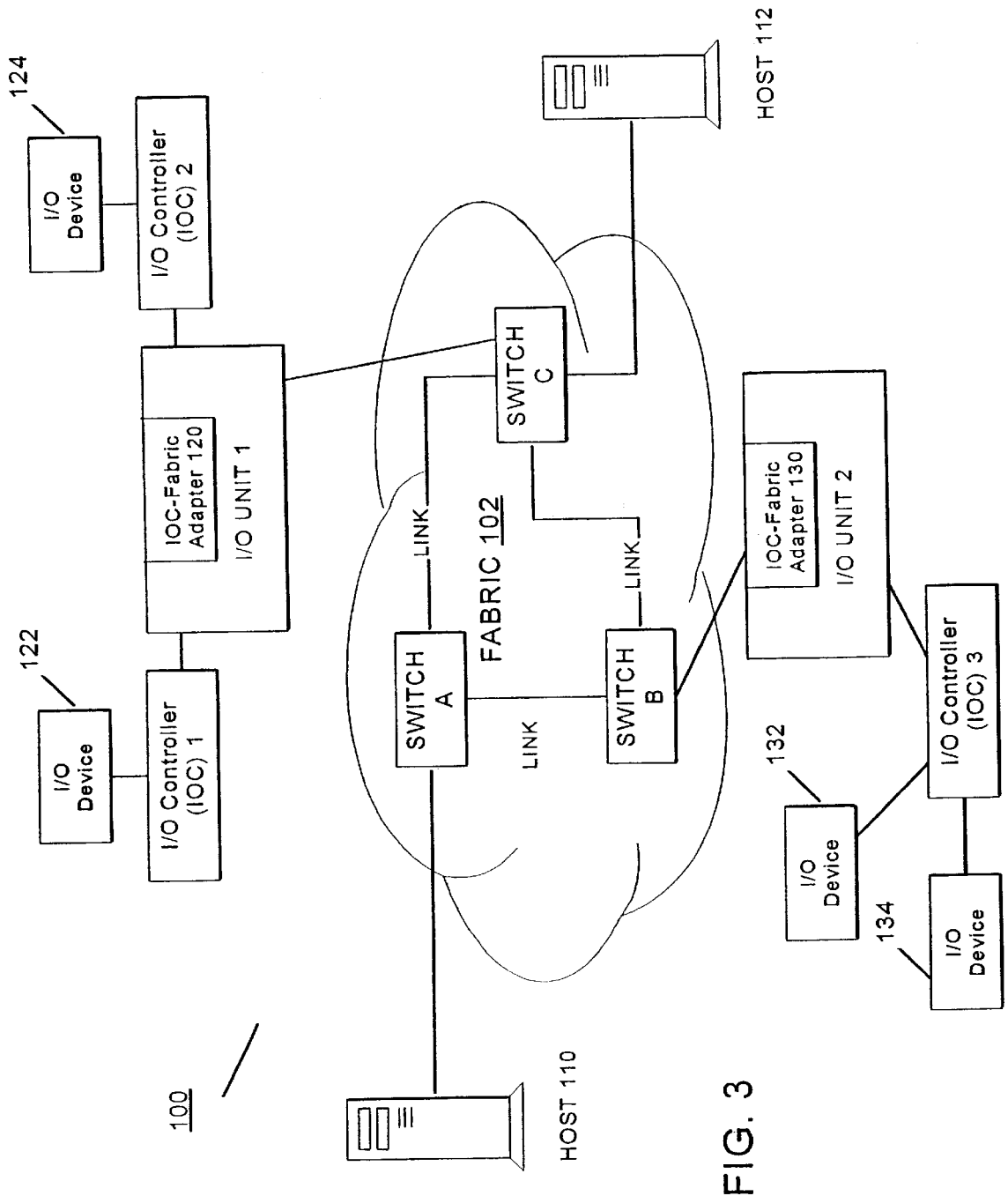
FIG. 3 illustrates an example data network according to an embodiment of the present invention.

Attention now is directed to the drawings and particularly to FIG. 3, which illustrates an example data network having several interconnected endpoints (nodes) for data communications. As shown in FIG. 3, the data network 100 may include, for example, an interconnection fabric (hereinafter referred to as "switched fabric") 102 of one or more switches or switch elements A, B and C and corresponding physical links for connecting a plurality of endpoints (nodes). The endpoints (nodes) may correspond to one or more I/O units 1 and 2, switch/switch elements, and computers and/or servers such as, for example, host 110 and host 112. I/O unit 1 may include one or more controllers connected thereto, including I/O controller 1 (IOC1) and I/O controller 2 (IOC2). Likewise, I/O unit 2 may include an I/O controller 3 (ICO3) connected thereto. Each I/O controller 1, 2 and 3 (IOC1, IOC2 and IOC3) may operate to control one or more I/O devices. For example, I/O controller 1 (IOC1) of the I/O unit 1 may be connected to I/O device 122, while I/O controller 2 (IOC2) may be connected to I/O device 124. Similarly, I/O controller 3 (IOC3) of the I/O unit 2 may be connected to I/O devices 132 and 134. The I/O devices may be any of several types of I/O devices, such as storage devices (e.g., a hard disk drive, tape drive) or other I/O device.

The hosts and I/O units including attached I/O controllers and I/O devices may be organized into groups known as clusters, with each cluster including one or more hosts and typically one or more I/O units (each I/O unit including one or more I/O controllers). The hosts and I/O units may be interconnected via a switched fabric 102, which is a collection of switches A, B and C and corresponding physical links connected between the switches A, B and C. In addition, each I/O unit includes one or more I/O controller-fabric (IOC-fabric) adapters for interfacing between the switched fabric 102 and the I/O controllers (e.g., IOC1, IOC2 and IOC3). For example, IOC-fabric adapter 120 may interface the I/O controllers 1 and 2 (IOC1 and IOC2) of the I/O unit 1 to the switched fabric 102, while IOC-fabric adapter 130 interfaces the I/O controller 3 (IOC3) of the I/O unit 2 to the switched fabric 102.

The specific number and arrangement of hosts, I/O units, I/O controllers, I/O devices, switches and links shown in FIG. 3 is provided simply as an example data network. A wide variety of implementations and arrangements of any number of hosts, I/O units, I/O controllers, I/O devices, switches and links in all types of data networks may be possible.

Figure 4:
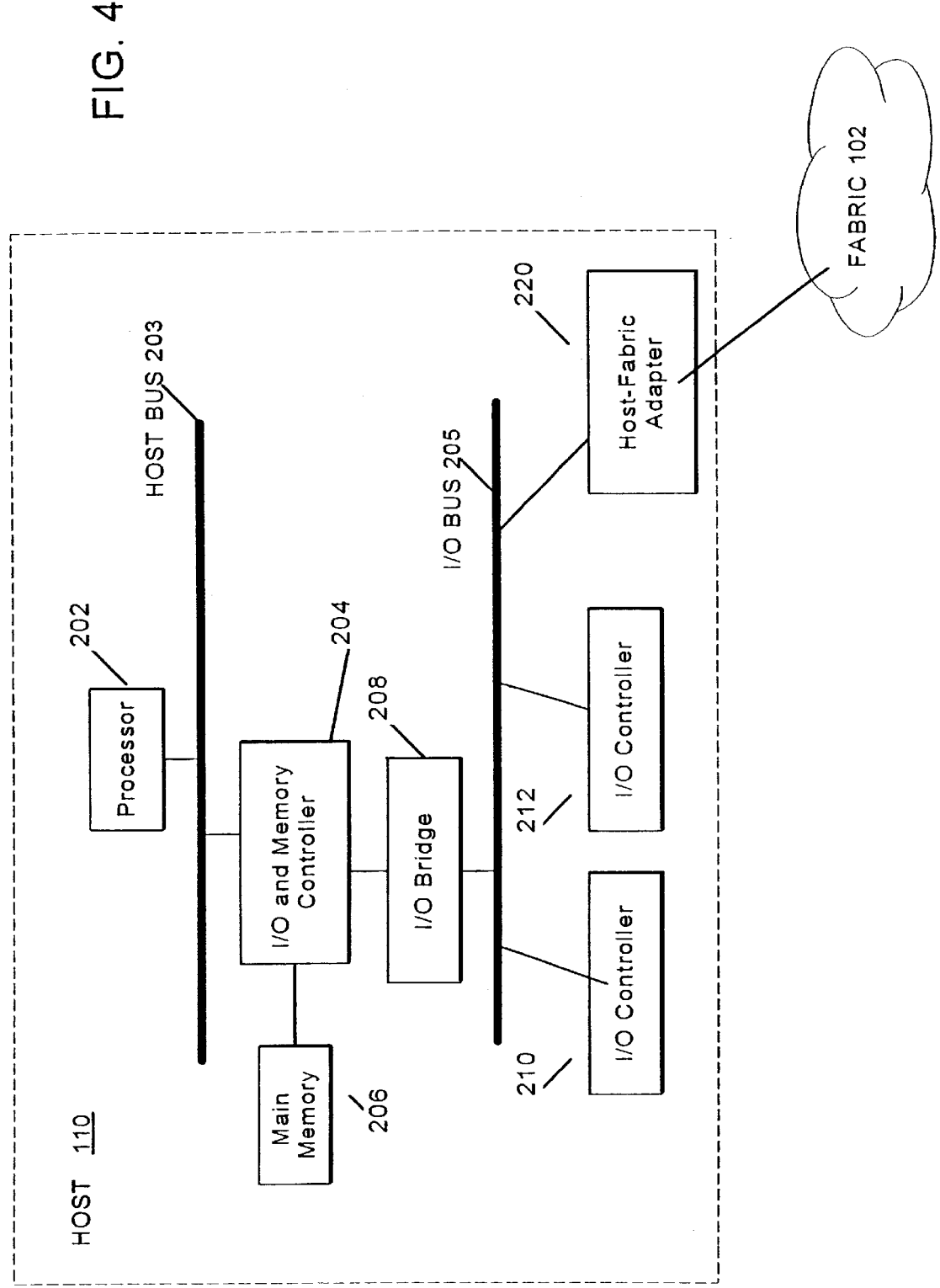
FIG. 4 illustrates a block diagram of a host of an example data network according to an embodiment of the present invention.

An example embodiment of a host (e.g., host 110 or host 112) may be shown in FIG. 4. Referring to FIG. 4, a host 110 may include a processor 202 coupled to a host bus 203. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

Figure 5:
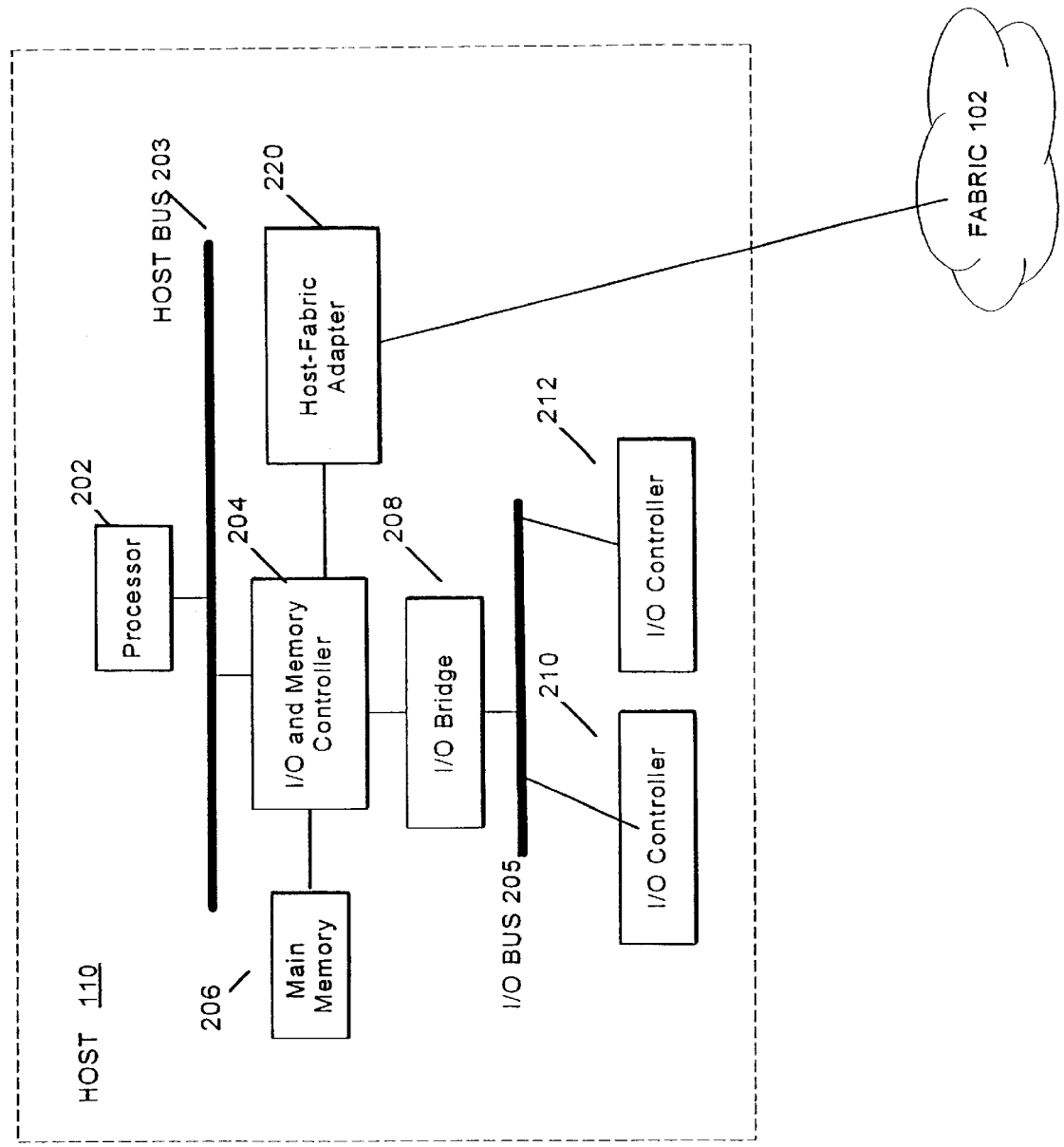
FIG. 5 illustrates a block diagram of a host of an example data network according to another embodiment of the present invention.

One or more host-fabric adapters 220 may also be connected to the I/O bus 205. Alternatively, the host-fabric adapter 220 may be connected directly to the I/O and memory controller (or chipset) 204 to avoid the inherent limitations of the I/O bus 205 as shown in FIG. 5. In either situation, the host-fabric adapter 220 may be considered to be a type of a network interface card (e.g., NIC which usually includes hardware and firmware) for interfacing the host 110 to a switched fabric 102. The host-fabric adapter 220 may be utilized to provide fabric communication capabilities for the host 110. For example, the host-fabric adapter 220 converts data between a host format and a format that is compatible with the switched fabric 102. For data sent from the host 110, the host-fabric adapter 220 formats the data into one or more packets containing a sequence of one or more cells including header information and data information.

According to one example embodiment or implementation, the hosts or I/O units of the data network of the present invention may be compatible with the "*Next Generation Input/Output (NGIO) Specification*" as set forth by the NGIO Forum on Mar. 26, 1999. According to the NGIO Specification, the switched fabric 102 may be an NGIO fabric, the host-fabric adapter 220 may be a Host Channel Adapter (HCA), and the IOC-fabric adapters may be Target Channel Adapters (TCA). The host channel adapter (HCA) may be used to provide an interface between the host 110 or 112 and the switched fabric 102 via high speed serial links. Similarly, target channel adapters (TCA) may be used to provide an interface between the switched fabric 102 and the I/O controller of either an I/O unit 1 or 2, or another network, including, but not limited to, local area network (LAN), wide area network (WAN), Ethernet, ATM and fibre channel network, via high speed serial links. Both the host channel adapter (HCA) and the target channel adapter (TCA) may be implemented in compliance with "Next Generation I/O Link Architecture Specification: HCA Specification, Revision 1.0" as set forth by NGIO Forum on Jul. 20, 1999 for enabling the endpoints (nodes) to communicate to each other over an NGIO channel(s). Each NGIO host may contain one or more host-fabric adapters (e.g., HCAs). Likewise, each I/O unit may contain one or more IOC-fabric adapters (e.g., TCAs). However, NGIO is merely one example embodiment or implementation of the present invention, and the invention is not limited thereto. Rather, the present invention may be applicable to a wide variety of data networks, hosts and I/O controllers.

As described with reference to FIGS. 3–5, the I/O units and respective I/O controllers may be connected directly to the switched fabric 102 rather than as part of a host 110. For example, I/O unit 1 including I/O controllers 1 and 2 (IOC1 and IOC2) and I/O unit 2 including an I/O controller 3 (IOC3) may be directly (or independently) connected to the switched fabric 102. In other words, the I/O units (and their connected I/O controllers and I/O devices) are attached as separate and independent I/O resources to the switched fabric 102 as shown in FIGS. 3–5, as opposed to being part of a host 110. As a result, I/O units including I/O controllers (and I/O devices) connected to the switched fabric 102 may be flexibly assigned to one or more hosts (rather than having a predetermined or fixed host assignment based upon being physically connected to the host's local I/O bus). The I/O units, I/O controllers and I/O devices which are attached to the switched fabric 102 may be referred to as fabric-attached I/O resources (i.e., fabric-attached I/O units, fabric-attached I/O controllers and fabric-attached I/O devices) because these components are directly attached to the switched fabric 102 rather than being connected as part of a host.

In addition, the host 110 may detect and then directly address and exchange data with I/O units and I/O controllers (and attached I/O devices) which are directly attached to the switched fabric 102 (i.e., the fabric-attached I/O controllers), via the host-fabric adapter 220. Software driver stack for the host-fabric adapter 220 may be provided to allow host 110 to exchange data with remote I/O controllers and I/O devices via the switched fabric 102, while preferably being compatible with many currently available operating systems, such as Windows 2000.

Figure 6:
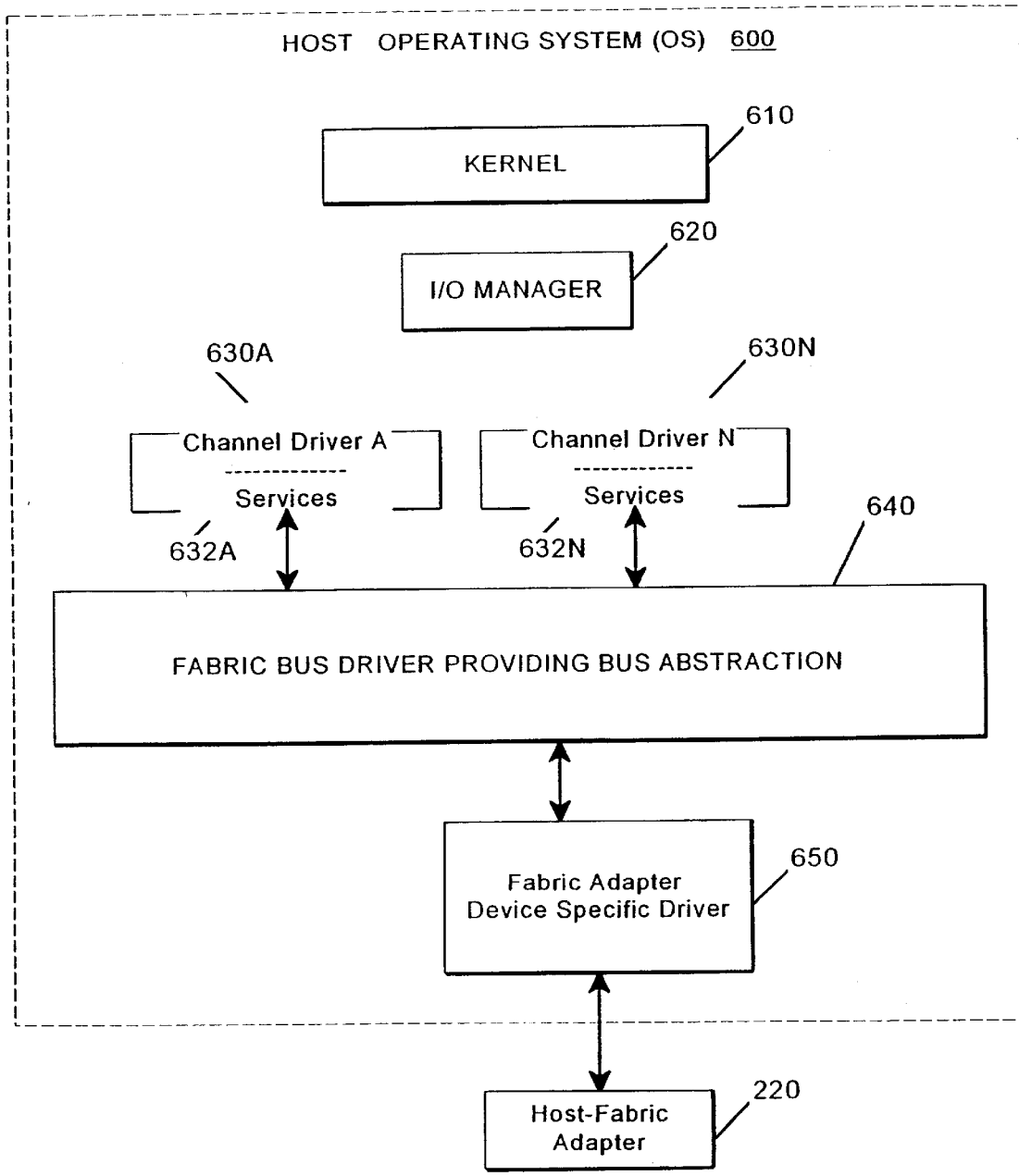
FIG. 6 illustrates an example software driver stack of a host of an example data network according to an embodiment of the present invention.

FIG. 6 illustrates an example software driver stack of a host 110 having fabric-attached I/O resources according to an example embodiment of the present invention. As shown in FIG. 6, the host operating system (OS) 600 includes a kernel 610, an I/O manager 620, and a plurality of channel drivers for interfacing to various I/O controllers, including channel drivers 630A–630N. According to an example embodiment, the host operating system (OS) 600 may be Windows 2000, and the I/O manager 620 may be a Plug-n-Play manager.

In addition, a host-fabric adapter software stack (driver module) may be provided to access the switched fabric 102 and information about fabric configuration, fabric topology and connection information. Such a software stack (driver module) may include a fabric bus driver 640 and a fabric adapter device-specific driver 650 utilized to establish communication with a target fabric-attached agent (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such software driver module may be provided on a tangible medium, such as a floppy disk or compact disk (CD) ROM, or via Internet downloads, which may be available for plug-in or download into the host operating system (OS).

According to a preferred embodiment of the present invention, the host-fabric adapter driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification.*" For example, the HCA services layer (HSL) may be inherent to every channel driver 630A–630N for providing fabric services, connection services and HCA services required by the channel driver to instantiate and use NGIO channels. The fabric bus driver 640 may correspond to the HCA abstraction layer (HCAAL) for managing all of the device-specific drivers, controlling resources common to all HCAs in a host and resources specific to each HCA in a host, distributing event information to the HSL and controlling access to specific device functions. Likewise, the device-specific driver 650 may correspond to the HCA device-specific driver for providing an abstract interface to all of the initialization, configuration and control interfaces of an HCA.

The host 110 may communicate with I/O units and I/O controllers (and attached I/O devices) which are directly attached to the switched fabric 102 (i.e., the fabric-attached I/O controllers) using a Virtual Interface (VI) architecture in compliance with the "*Virtual Interface (VI) Architecture Specification, Version* 1.0," as set forth by Compaq Corp., Intel Corp., and Microsoft Corp., on Dec. 16, 1997.

Figure 7:
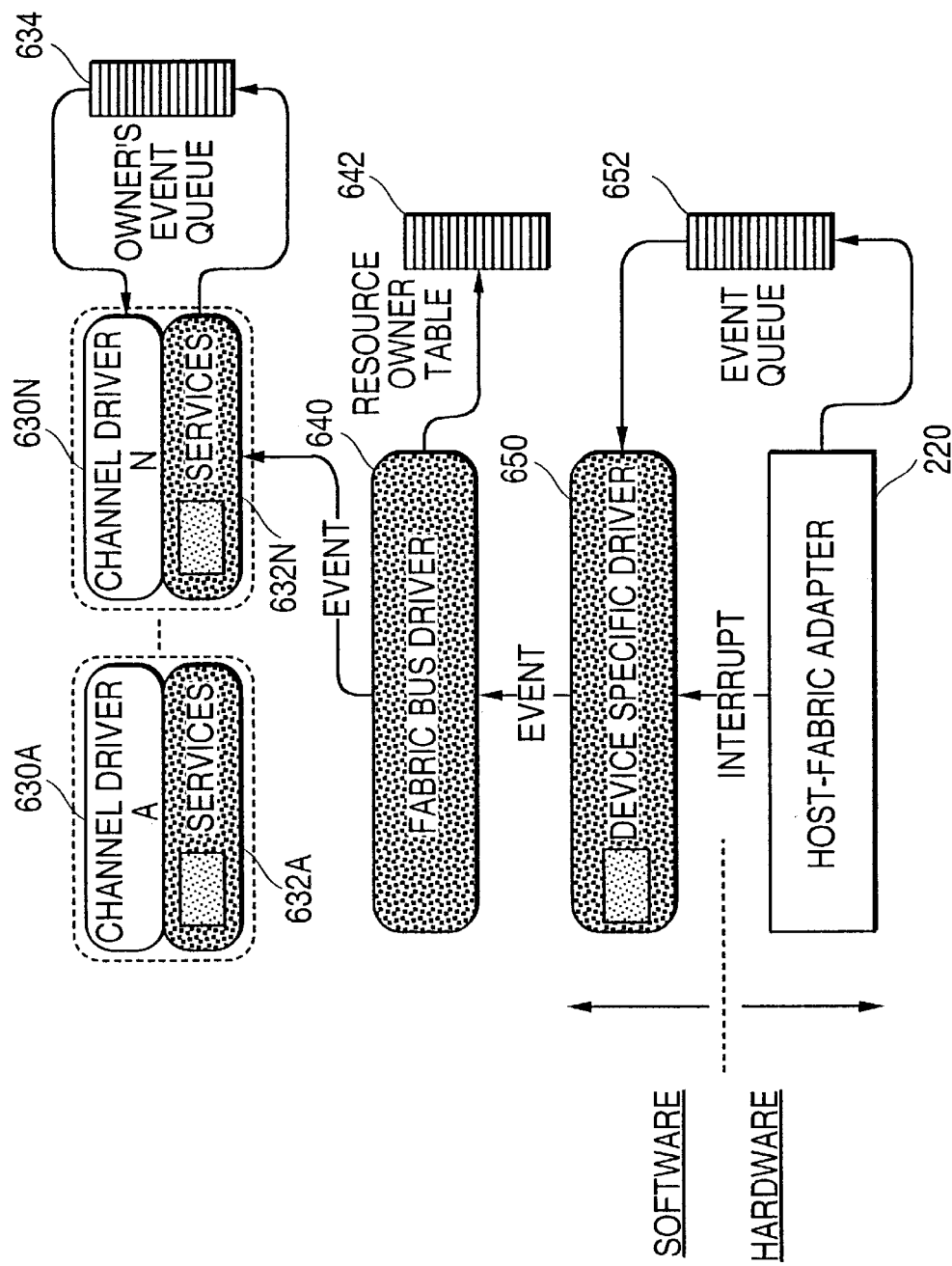
FIG. 7 illustrates an example software driver stack of a host for handling multiple interrupts (event requests) and directing a particular interrupt (event request) and associated information to a specific driver according to an embodiment of the present invention.

Turning now to FIG. 7, an example software driver stack of a host 110 having multiple software drivers for handling multiple device interrupts (event requests) from the hardware-based host-fabric adapter 220 and effectively directing a particular interrupt (event request) and associated information to a specific channel driver from all available channel drivers 630A–63ON in a host 110 according to an embodiment of the present invention is illustrated. Such a software driver stack constitutes a Virtual Interrupt Mechanism for each channel driver 630A–630N to handle the flow of event information from a host-fabric adapter 220 to a designated channel driver in a host 110. Interrupts may include, for example, events generated by the host-fabric adapter 220 either in response to an error or when an event request is outstanding and the conditions for that request have been fulfilled. All Events may refer to a specific resource available for the host-fabric adapter 220 for resource configurations to form one or more channels and exchange data with another node through those channels (e.g., paths between two communicating hosts and/or I/O units that allow control and data to flow through the switched fabric). Resources may relate either to a specific host-fabric adapter or common to all host-fabric adapters in a host 110. Each Event may encode therein the resource type, resource identification and the reason the Event was generated.

The host-fabric adapter 220 may add entries to an Event Queue 652 in response to an error detection or when an event request is outstanding and the conditions for that request have been fulfilled. Each host-fabric adapter may include its own specific Event Queue (EQ). Under the control of the device specific driver 650, the host-fabric adapter 220 may assert an interrupt signal line to indicate that a new entry has been added to the Event Queue 652.

The device-specific driver 650 may be responsible for managing the interrupts and removing entries from the Event Queue 652 by creating a private copy of the Event and setting the entry in the Event Queue 652 to an initial preset value, such as zero (0). The device-specific driver 650 may then forward the Event along with the host-fabric adapter identification to the next layer of the software driver stack.

The fabric bus driver 640 may be responsible for distributing Events to the proper channel driver 630A–630N. Typically, the fabric bus driver 640 determines the ownership of the resource identified by the Event using the supplied host-fabric adapter identification and the information encoded in the Event from a resource owner table 642. An Event for a resource owned by the fabric bus driver 640 may be handled by exception processing functions within the fabric bus driver 640. An Event for a resource owned by a particular channel driver from all available channel drivers 630A–630N may then be forwarded to that channel driver along with the host-fabric adapter identification and a context value supplied to a corresponding host service layer (HSL) of the channel driver 630N when the channel driver 630N configured the resource. The context value may be a channel driver defined data item that may be an integer or a pointer to a data structure.

The HSL 632A–632N may add the forwarded event information to the corresponding channel driver 630A–620N. The channel drivers 630A–630N may maintain a private Event Queue 634 that is used to coalesce Events from all host-fabric adapters where resources are owned. The Event Queue 634 may be managed preferably as a circular queue. Events may be added to the Event Queue 634 without checking for the overwriting of prior events. The channel drivers 630A–630N may be responsible for properly sizing the queue, removing entries from the queue and detecting queue overruns. Each channel driver may define a single, private Event Queue from a region of host memory so as to accommodate the amount of the expected resource ownership.

The HSL 632A–632N may support the ability for channel drivers 630A–630N to request, via the HSL 632N, that a specific routine be executed after the next event is added to the Event Queue 634. The routine is to be executed may be referred to as the channel driver's virtual interrupt service routine (VISR). The length of time between adding an event to the Event Queue 634 and starting execution of the VISR may depend on the implementation. Multiple events may be added to the Event Queue 634 prior to the start of execution of the VISR.

In addition to the VSIR scheme, the HSL 632A–632N may allow channel drivers 630A–630N to specify that an HSL function be executed in place of the channel driver supplied VISR when the next event is added to their private Event Queue 634. This mechanism may be used to supporting operating system (OS) dependent mechanisms for informing a channel driver that events have been added to its private Event Queue.

The channel drivers 630A–630N may use HSL functions to decode the Event and determine the nature of the Event. For example, if the Virtual Interrupt Mechanism is implemented in compliance with the "*Next Generation Input/Output (NGIO) Specification*" then the Events described may be either notification events or error events. Completion notifications may be supported by the resource context information supplied with the Event. Such notifications may result when the channel driver requests an Event on a specific queue and the conditions for that request have been fulfilled. Error notifications may be supported by the HSL 632A–632N of the channel drivers 630A–630N. The channel drivers 630A–630N may require different error handling policies provided by the HSL 632A–630N to handle Events that indicate an error. Error Events may be described in the "*Next Generation I/O Architecture: Host Channel Adapter Software Specification.*" For example, these error events may include send work queue errors, receive work queue errors, remote errors, local errors, completion queue errors and port errors. The set of allowable responses to an error may be dependent on the type of resources, the state of that resource, and the configuration of the resource.

Now, the flow of event information through the Virtual Interrupt Mechanism according to an embodiment of the present invention may be described with reference to FIG. 7 hereinbelow. First, the host-fabric adapter 220 adds an Event to the Event Queue 652 in response to an error detection or when an event request is outstanding and the conditions for that request have been fulfilled. Under the control of the device-specific driver 650, the host-fabric adapter 220 may assert an interrupt signal line to indicate that a new entry has been added to the Event Queue 652.

In response to an Event Queue interrupt, the device-specific driver 650 removes an Event entry from the Event Queue 652 and then forwards the Event along with the host-fabric adapter identification to the next layer of the software driver stack.

Next, the fabric bus driver 640 determines the ownership of the resource identified by the Event using the supplied host-fabric adapter identification and the information encoded in the Event from the resource owner table 642. An Event for a resource owned by the fabric bus driver 640 is handled by exception processing functions within the fabric bus driver 640. In contrast, an Event for a resource owned by a particular channel driver (for example, channel driver 630N) from all available channel drivers 630A–630N is forwarded to that channel driver along with the host-fabric adapter identification and a context value supplied to a corresponding host service layer (HSL) 632N of the channel driver 630N when the channel driver 630N configured the resource.

The HSL 632N then adds the forwarded event information to the channel driver Event Queue 634 whereupon the designated channel driver 632N may remove entries from the Event Queue 634, decode the Event and process the same as requested in order to exchange data with another node via the switched fabric 102 (see FIGS. 3–5).

Figure 8:
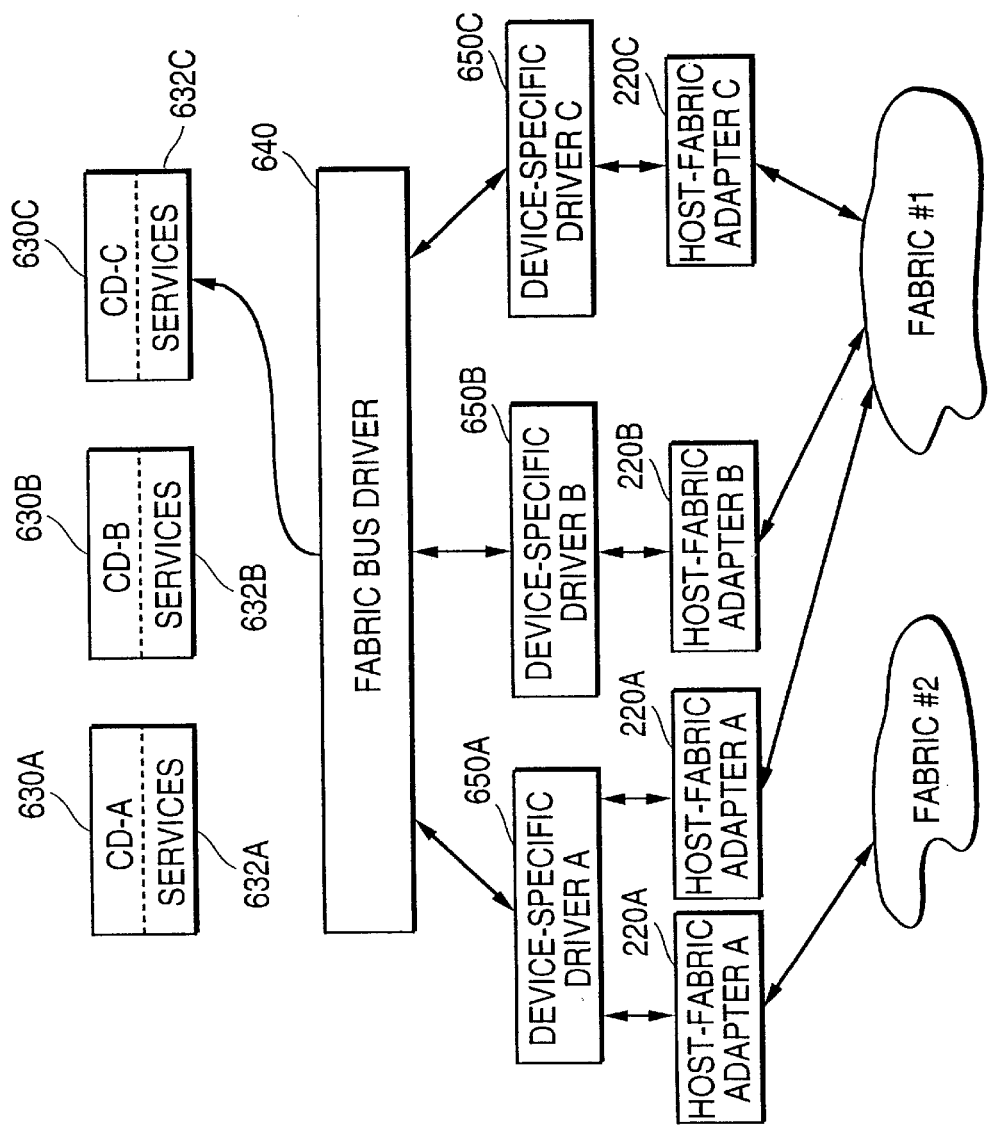
FIG. 8 illustrates another example software driver stack of a host for handling multiple interrupts (event requests) and directing a particular interrupt (event request) and associated information to a specific driver according to another embodiment of the present invention.

FIG. 8 illustrates another example software driver stack of a host 110 having multiple software drivers for handling multiple device interrupts (event requests) from the hardware-based host-fabric adapter 220 and effectively directing a particular interrupt (event request) and associated information to a specific channel driver from all available channel drivers 630A–630N in a host 110 according to another embodiment of the present invention. As shown in FIG. 8, the host 110 may contain more than one host-fabric adapters manufactured from different electronic makers. For example, host-fabric adapters 220A may be made from Brand A. Similarly, a host-fabric adapter 220B may be made from Brand B. Likewise, a host-fabric adapter 220C may be made from Brand C. These host-fabric adapters 220A–220C may also be connected to different switched fabrics #1 and #2. Different brand of host-fabric adapters may be managed differently by different device-specific drivers 650A–650C of the software driver stack. However, all of the device-specific drivers 650A–650C may be managed by the same fabric bus driver 640. In particular, the fabric bus driver 640 may abstract any number of the host-fabric adapters to a single interface, make each host-fabric adapter look the same and control resources common to all host-fabric adapters in a host as well as resources of each host-fabric adapter in a host. In addition, the fabric bus driver 640 may distribute event information to the HSL 632A–632C of the channel drivers 630A–630C handled in the manner described with reference to FIG. 7.

As described from the foregoing, the present invention advantageously provides a Virtual Interrupt Mechanism to each channel driver for handling multiple device interrupts (event requests) from the hardware-based host-fabric adapter and effectively directing a particular interrupt (event request) and associated information to a specific channel driver in a host.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is also applicable to all types of redundant type networks, including, but not limited to, Next Generation Input/Output (NGIO), ATM, SAN (system area network, or storage area network), server net, Future Input/Output (FIO), fiber channel, Ethernet. In addition, the event handling steps of FIG. 7 may be performed by a computer processor executing instructions organized from the software driver module. Storage devices suitable for tangibly embodying software driver module instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host comprising:

a processor;

at least one host-fabric adapter coupled to said processor and provided to interface with a switched fabric, which generates an event; and an operating system comprising multiple channel drivers and a host-fabric adapter software stack having a plurality of functional layers to access the switched fabric and to access information about fabric configuration, fabric topology, and connection information, the host-fabric adapter software stack providing a virtual interrupt mechanism to each channel driver to handle the flow of event information between the host-fabric adapter and a designated channel driver to process the event information.

2. The host as claimed in claim 1, wherein said event is generated by the host-fabric adapter in response to an error detection or when an event request is outstanding and the conditions for that request have been fulfilled.

3. The host as claimed in claim 2, wherein said event indicates a specific resource available for the host-fabric adapter for resource configurations to form one or more channels and exchange data with another host through said channels, via said switched fabric.

4. The host as claimed in claim 3, wherein said event is encoded therein a resource type, resource identification and the reason the event was generated.

5. A host comprising:

a processor;

at least one host-fabric adapter coupled to said processor and provided to interface with a switched fabric, which generates an event; and an operating system comprising multiple channel drivers and a host-fabric adapter software stack providing a virtual interrupt mechanism to each channel driver to handle the flow of event information between the host-fabric adapter and a designated channel driver to process the event information, wherein said host-fabric adapter software stack comprises:

a device-specific driver which provides an abstract interface to all of the initialization, configuration and control interfaces of the host-fabric adapter;

a fabric bus driver which manages the device-specific driver, controls resources common to all host-fabric adapters in said host and resources specific to each host-fabric adapter in said host, distributes event information and controlling access to specific device functions; and a services layer inherent to every channel driver for handling events.

6. The host as claimed in claim 5, wherein said host-fabric adapter adds an event entry to an Event Queue in response to an error detection or when an event request is outstanding and the conditions for that request have been fulfilled, and asserts an interrupt signal line to indicate that a new entry has been added to the Event Queue.

7. The host as claimed in claim 6, wherein said host-fabric adapter software stack comprises:

a device-specific driver which manages the event and removes the event from the Event Queue by creating a private copy of the event and setting the entry in the Event Queue to an initial preset value;

a fabric bus driver which determines the ownership of the resource identified by the event using a supplied host-fabric adapter identification and the information encoded in the event from a resource owner table, and forwards to an identified channel driver along with the host-fabric adapter identification; and a services layer inherent to every channel driver which adds the forwarded event to an Event Queue of the designated channel driver so that the designated channel driver may remove the forwarded event and determine the nature of the event.

8. The host as claimed in claim 7, wherein said host-fabric adapter software stack complies with the "*Next Generation Input/Output (NGIO) Specification*" and the "*Next Generation I/O Architecture: Host Channel Adapter Software Specification*" to describe error events.

9. The host as claimed in claim 6, wherein said virtual interrupt mechanism handles the flow of event information by:

removing an event entry from the Event Queue of the host-fabric adapter in response to receipt of the Event Queue interrupt;

determining the ownership of the resource identified by the Event using a supplied host-fabric adapter identification and the information encoded in the Event from a resource owner table; and adding the forwarded event information to an Event Queue of the designated channel driver for enabling the designated channel driver to remove the event entry from the Event Queue, decode the event and process the same so as to exchange data with another host via said switched fabric.

10. A network, comprising:

a switched fabric;

I/O controllers attached to said switched fabric; and a host comprising a host-fabric adapter provided to interface with said switched fabric and generate an event, and an operating system comprising multiple channel drivers and a host-fabric adapter software stack having a plurality of functional layers to access the switched fabric and to access information about fabric configuration, fabric topology, and connection information, the host-fabric adapter software stack providing a virtual interrupt mechanism to each channel driver to handle the flow of event information between the host-fabric adapter and a designated channel driver to process the event information.

11. The network as claimed in claim 10, wherein said event is generated by the host-fabric adapter in response to an error detector or when an event request is outstanding and the conditions for that request have been fulfilled.

12. The network as claimed in claim 10, wherein said event indicates a specific resource available for the host-fabric adapter for resource configurations to form one or more channels and exchange data with an I/O controller through said channels, via said switched fabric.

13. The network as claimed in claim 10, wherein said event is encoded therein a resource type, resource identification and the reason the event was generated.

14. The network of claim 10, wherein the network is a redundant type network.

15. The network of claim 10, wherein the network is a NGIO network.

16. A network, comprising:

a switched fabric;

I/O controllers attached to said switched fabric; and a host comprising a host-fabric adapter provided to interface with said switched fabric and generate an event, and an operating system comprising multiple channel drivers and a host-fabric adapter software stack providing a virtual interrupt mechanism to each channel driver to handle the flow of event information between the host-fabric adapter and a designated channel driver to process the event information, wherein said host-fabric adapter software stack comprises:

a device-specific driver which provides an abstract interface to all of the initialization configuration and control interfaces of the host-fabric adapter;

a fabric bus driver which manages the device-specific driver, controls resources common to all host-fabric adapters in said host and resources specific to each host-fabric adapter in said host, distributes event information and controlling access to specific device functions; and a services layer inherent to every channel driver for handling events.

17. The network as claimed in 16, wherein said host-fabric adapter adds an event entry to an Event Queue in response to an error detection or when an event request is outstanding and the conditions for that request have been fulfilled, and asserts an interrupt signal line to indicate that a new entry has been added to the Event Queue.

18. The network as claimed in claim 17, wherein said host-fabric adapter software stack comprises:

a device-specific driver which manages the event arid removes the event from the Event Queue by creating a private copy of the event and setting the entry in the Event Queue to an initial preset value;

a fabric bus driver which determines the ownership of the resource identified by the event using a supplied host-fabric adapter identification and the information encoded in the event from a resource owner table, and forwards to an identified channel driver along with the host-fabric adapter identification; and a services layer inherent to every channel driver which adds the forwarded event to an Event Queue of the designated channel driver so that the designated channel driver may remove the forwarded event and determine the nature of the event.

19. The network as claimed in claim 18, wherein said host-fabric adapter software stack complies with the "Next Generation Input/Output (NGIO) Specification" and the "Next Generation I/O Architecture: Host Channel Adapter Software Specification" to describe error events.

20. The network as claimed in claim 18, wherein said virtual interrupt mechanism handles the flow of event information by:

removing an event entry from the Event Queue of the host-fabric adapter in response to receipt of the Event Queue interrupt;

determining the ownership of the resource identified by the Event using a supplied host-fabric adapter identification and the information encoded in the Event from a resource owner table; and adding the forwarded event information to an Event Queue of the designated channel driver for enabling the designated channel driver to remove the event entry from the Event Queue, decode the event and process the same so as to exchange data with another host via said switched fabric.

21. The network of claim 16, wherein the network is an ATM network.

22. The network of claim 16, wherein the network is a storage area network.

23. A computer usable medium having computer readable program codes embodied therein for use in a host to handle the flow of event information generated from one of host-fabric adapters connected to a switched fabric, said computer readable program codes comprising:

a device-specific driver which provides an abstract interface to all of the initialization, configuration and control interfaces of the host-fabric adapters;

a fabric bus driver which manages the device-specific driver, controls resources common to all host-fabric adapters in said host and resources specific to each host-fabric adapter in said host, distributes event information and controlling access to specific device functions; and a channel driver which handles the event information received through the device-specific driver and the fabric bus driver.

24. The computer usable medium as claimed in claim 23, wherein said computer readable program codes further handle the flow of event information by:

removing an event entry from an Event Queue of one of said host-fabric adapters in response to receipt of an Event Queue interrupt;

determining the ownership of the resource identified by an Event using a supplied host-fabric adapter identification and the information encoded in the Event from a resource owner table; and adding the forwarded event information to an Event Queue of said channel driver for enabling said channel driver to remove the event entry from the Event Queue, decode the event and process the same so as to exchange data with another host via said switched fabric.

25. A method for handling multiple device events from a hardware-based host-fabric adapter and directing a particular event and associated information to a designated one of channel drivers in a host, comprising:

removing an event entry indicating said particular event from an event queue of the host-fabric adapter in response to an event queue interrupt;

determining the ownership of the resource identified by said particular event using a supplied host-fabric adapter identification and the information encoded in the event from a resource owner table; and adding the forwarded event information to an event queue of the designated one of channel drivers for enabling the designated channel driver to remove the event entry from the event queue, decode the event and process the same so as to exchange data with another host via said switched fabric.

26. The method as claimed in claim 25, wherein said event indicates a specific resource available for the hardware-based host-fabric adapter for resource configurations to form one or more channels and exchange data with another host through said channels, via said switched fabric.

* * * * *

UNITED STATES PATENT AND TRADEMARK OFFICE
CERTIFICATE OF CORRECTION

PATENT NO.    : 6,760,783 B1
DATED         : July 6, 2004
INVENTOR(S)   : Berry

It is certified that error appears in the above-identified patent and that said Letters Patent is hereby corrected as shown below:

Column 5,
Line 62, delete "63ON" and insert -- 630N --.

Signed and Sealed this

Seventh Day of September, 2004

JON W. DUDAS
*Director of the United States Patent and Trademark Office*